United States Patent [19]
Heath et al.

[11] Patent Number: 6,006,034
[45] Date of Patent: Dec. 21, 1999

[54] SYSTEMS AND METHODS FOR AUTOMATIC APPLICATION VERSION UPGRADING AND MAINTENANCE

[75] Inventors: Clifford Heath, Mount Waverly; Graeme Port, Surrey Hills, both of Australia; Steven Klos, Nashua; Graeme Greenhill, Londonderry, both of N.H.

[73] Assignee: Open Software Associates, Ltd., Kingwood, Australia

[21] Appl. No.: 08/707,622

[22] Filed: Sep. 5, 1996

[51] Int. Cl.[6] .................................................. G06F 9/06
[52] U.S. Cl. ............................................................. 395/712
[58] Field of Search ........................... 395/712, 200.51, 395/200.5, 200.47, 200.49, 500, 181; 707/203, 507, 200; 380/4; 370/316

[56] References Cited

U.S. PATENT DOCUMENTS

| | | | |
|---|---|---|---|
| 4,714,992 | 12/1987 | Gladney et al. | 364/200 |
| 5,005,122 | 4/1991 | Griffin et al. | 364/200 |
| 5,008,814 | 4/1991 | Mathur | 364/200 |
| 5,019,963 | 5/1991 | Alderson et al. | 364/200 |
| 5,155,847 | 10/1992 | Kirouac et al. | 395/600 |
| 5,247,683 | 9/1993 | Holmes et al. | 395/700 |
| 5,343,527 | 8/1994 | Moore | 380/4 |
| 5,440,723 | 8/1995 | Arnold et al. | 395/181 |
| 5,448,727 | 9/1995 | Annevelink | 395/600 |
| 5,495,610 | 2/1996 | Shing et al. | 395/600 |
| 5,555,416 | 9/1996 | Owens et al. | 395/700 |
| 5,577,244 | 11/1996 | Killebrew et al. | 395/703 |
| 5,581,764 | 12/1996 | Fitzgerald et al. | 395/703 |
| 5,586,304 | 12/1996 | Stupek, Jr. et al. | 395/712 |
| 5,721,911 | 2/1998 | Ha et al. | 707/100 |
| 5,724,345 | 3/1998 | Guarneri et al. | 370/316 |
| 5,732,266 | 3/1998 | Moore et al. | 395/651 |
| 5,732,275 | 3/1998 | Kullick et al. | 395/712 |
| 5,734,898 | 3/1998 | He | 707/203 |
| 5,737,533 | 4/1998 | De Hond | 395/200.49 |
| 5,752,042 | 5/1998 | Cole et al. | 395/712 |
| 5,754,830 | 5/1998 | Butts et al. | 395/500 |
| 5,758,342 | 5/1998 | Gregerson | 280/602 |
| 5,768,511 | 6/1998 | Galvin | 395/200.33 |
| 5,794,259 | 4/1998 | Kikinis | 707/507 |
| 5,848,421 | 12/1998 | Brichta et al. | 707/200 |

OTHER PUBLICATIONS

Kirtland, Mary, "Safe Web Surfing with the Internet Component Download Service," Microsoft Systems Journal, Jul. 1996, 7 pages.

Primary Examiner—Tod R. Swann
Assistant Examiner—Matthew Smithers
Attorney, Agent, or Firm—Hamilton, Brook, Smith & Reynolds, P.C.

[57] ABSTRACT

The present invention relates to methods and systems for maintaining application programs on a client computer in a client-server network environment. The task of dynamically upgrading components in the application program running on a client is greatly simplified by rendering control to the individual client rather than to a central server. The version updating procedures of the present invention further provides steps to ensure speedy and error-free transfer of the required files and components through an open network environment, such as the Internet.

96 Claims, 13 Drawing Sheets

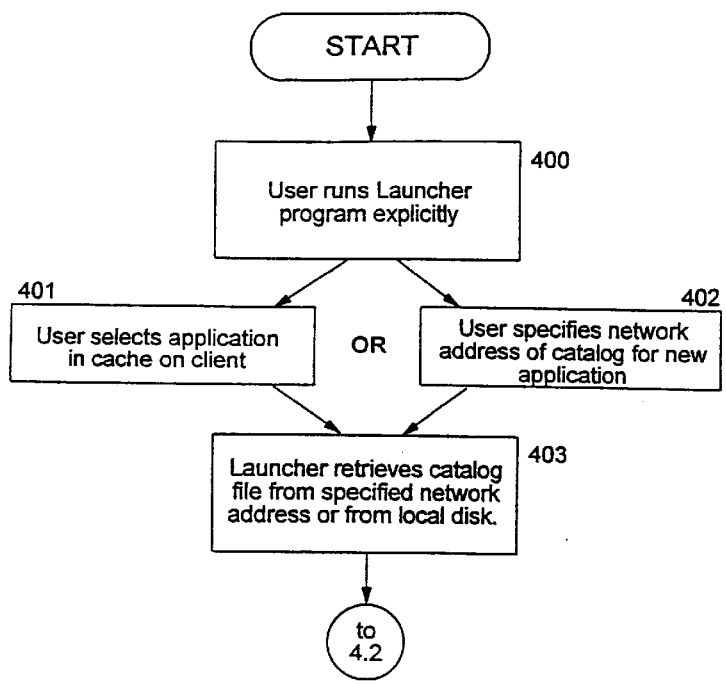
Figure 4A
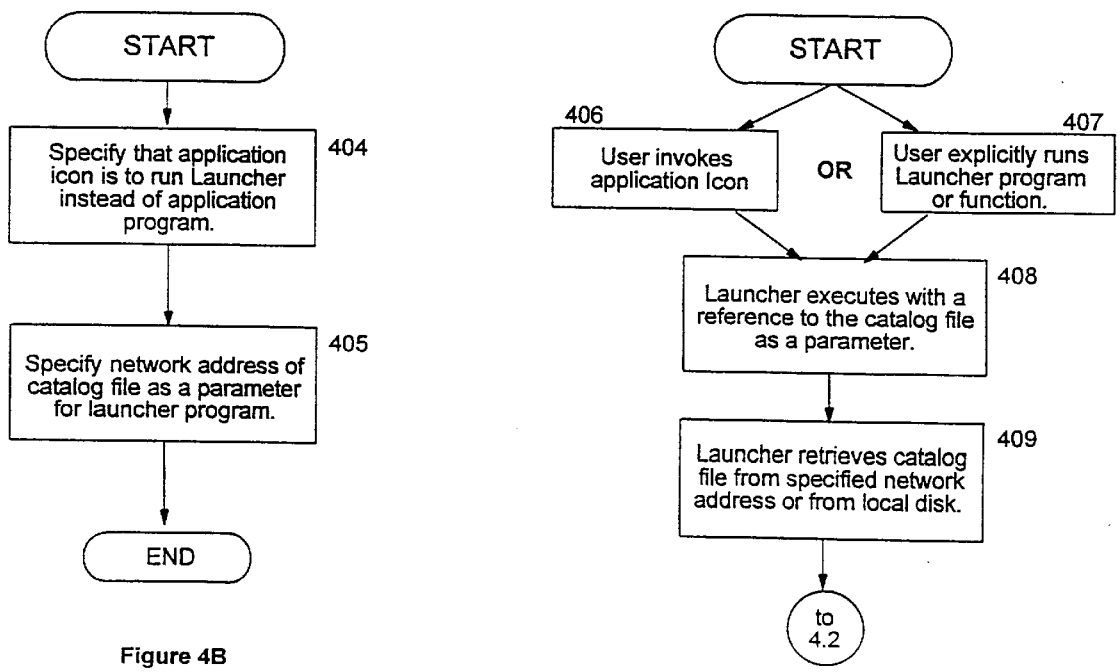
Figure 4B
Figure 4C

SYSTEMS AND METHODS FOR AUTOMATIC APPLICATION VERSION UPGRADING AND MAINTENANCE

BACKGROUND OF THE INVENTION

The present invention relates to methods and systems for maintaining components of application programs in a client/server network environment. A client is a personal computer or a workstation that operates on a network to execute various application programs. A server is typically a larger, centralized computer on the network which services the clients by providing programs, files and data, and by controlling hardware devices shared by the clients.

An application program typically comprises a number of components each of which exists as a separately addressable file, and where each component is identified by a version number, perhaps indicating its creation date. An application program may typically undergo numerous revisions and updates throughout the course of its operational existence on the client. In the network environment, an application program on the client can be kept current by replacing one or more of such components, or by adding or deleting components. The components having the latest version numbers can be maintained on the central server and distributed from the server to each individual client as needed through a standard file transfer protocol.

In the prior art systems, the version upgrading or component upgrading procedures are driven by the central server through complex interactions between the server and client systems.

SUMMARY OF THE INVENTION

Server-driven methods, however, are inherently unsuited for applications running on open-architecture networks, such as the Internet or intranet settings, in which the individual clients are difficult to access and control. The methods and systems of the present invention significantly improve the version updating process in a client-server environment in which such updating requires frequent and efficient deployment of the application components. In particular, the present invention shifts the version updating control to the individual client rather than the server, not only to reduce processing burden on the server but also to enable version updating in an open network environment, such as the Internet, where the source providing servers generally cannot control the remote clients. The methods of the present invention further adds security and protection from potential file corruption and undue delays during file transfer from a server to a client. By intelligently and automatically selecting to download and update only the needed and changed components of an application program, the present method alleviates the concerns of time and efficiency in any client-server network environment which requires highly dynamic application updates.

In the preferred embodiment, the present invention involves maintaining on a server the components of an application program, each having a version identification, and maintaining a catalog of components with the version identifications. The components may include executable codes, library files, parameter files, and data files of the application program. The application program is further maintained at a client. In response to a call to the server from the client, the server is caused to download the catalog to the client and the client compares the version identifications between the components maintained on the server as indicated in the downloaded catalog and the components maintained on the client. The application program on the client is updated by downloading from the server to the client the selected components for which the version identifications do not match. The updated application program is then executed on the client.

The above preferred method further comprises updating the application program on the client by downloading from the server to the client the selected components specified in the catalog which are new and, therefore, not present on the client. This also makes possible the initial installation of the application on the client. Similarly, the catalog file can specify and cause to delete from the client any components previously included in the application program which are no longer needed to execute in the updated version.

In the preferred embodiment, the catalog is used to specify: network addresses of other servers from which the catalog or component modules can be retrieved in subsequent updates; directory locations on the client for storing the downloaded components for proper execution of the application program on the client; and procedures for executing programs on the client, such as virus scanning code, after each component is downloaded as well as prior to and following the execution of the updated application program.

In the preferred embodiment, the catalog file retained on the client specifies a maximum wait-time interval to limit any delay associated with updating the application program, and a list of further servers on the network, each including a copy of the catalog file. When, in response to the call to the server from the client, the server fails to download the catalog within the maximum wait-time interval, the client cancels the download and routes the call to one of the further servers to engage a new download and so on until the catalog has been downloaded within the specified maximum wait-time interval.

In the preferred embodiment, the catalog file is specified with a cryptographic digest for each component to ensure its authenticity and integrity. The client updates the application program on the client by downloading and replacing selected components for which the cryptographic digests do not match, and the client further computes the cryptographic digests on the client to ensure that each of the downloaded components is authentic and that each has not been corrupted during the download transmission.

In the preferred embodiment, the frequency of the updating procedure is defined on a periodic basis or on an event-driven basis. For example, a predefined time interval, such as a day or week can be specified in the catalog, or by a user, and the application program is updated only on the first time the application is run in a specified time interval. In another embodiment, the application program on the client is automatically updated by an operating system or by a launcher program executed by a startup command on the client each time the client is booted up. In such an embodiment, the application program is caused to be updated regardless of whether the application program is executed at the client. Similarly, the client can be configured to update the application program periodically only as necessary to replace either outdated or corrupted components, or to delete any modules no longer needed, or to add any new modules.

In the preferred embodiment, the call to the server from the client is transmitted to the server by a launcher program on the client which operates as a proxy to the application program. Selecting the application from the client to execute the program engages the launcher to communicate with the server, to cause the server to download the catalog file, and to update the application program on the client and execute the updated application program on the client. In such an embodiment, the launcher can be implemented as a separate utility program or as a functional component of an operating system of the client and run invisibly in the background.

Once the catalog file has been retrieved and processed in accordance with the method of the present invention, the status of each updating of the application program, including names of the components replaced, deleted or added on the client and related procedures, can be recorded in a file on the client for tracking and reporting the program usage and updates. Information in the downloaded catalog file, which at least includes the list of names and version identifications of the components for the updated application program, is stored on the client to be used in a subsequent update. The catalog file can also be specified to include a procedure to delete the components following the execution of the updated application program to free up disk space on the client.

With the method of the present invention, controlling a version upgrade at the client through an open network environment, such as the Internet, can be easily implemented. In the Internet environment, for example, the call to a server for updating the application program can be made through a hypertext link on a Web browser directed to the catalog on the server. The launcher program can be integrated into the browser as a helper application, a plug-in module, or as a browser control. When the link is selected from the client browser, the launcher is executed to update the corresponding application components on the client. The downloading chores of the update can be accomplished through standard file transfer methods such as the file transfer protocol or the hypertext transfer protocol. The catalog file can also be specified to include a procedure to install on the client desktop an icon or a shortcut which enables the end user to run the application without accessing the Web page in subsequent updates.

The above and other features of the invention including various novel details of construction and combinations of parts will now be more particularly described with reference to the accompanying drawings and pointed out in the claims. These features are described with reference to installing and maintaining complete applications, but can also be used for individual components such as data files. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE DRAWINGS

FIG. 4A illustrates one embodiment of the launcher configuration.

FIGS. 4B to 4E illustrate the preferred embodiment of the launcher configuration and the detailed preferred updating process of the present invention.

DETAILED DESCRIPTION OF THE PREFERRED EMBODIMENTS

Figure 1:
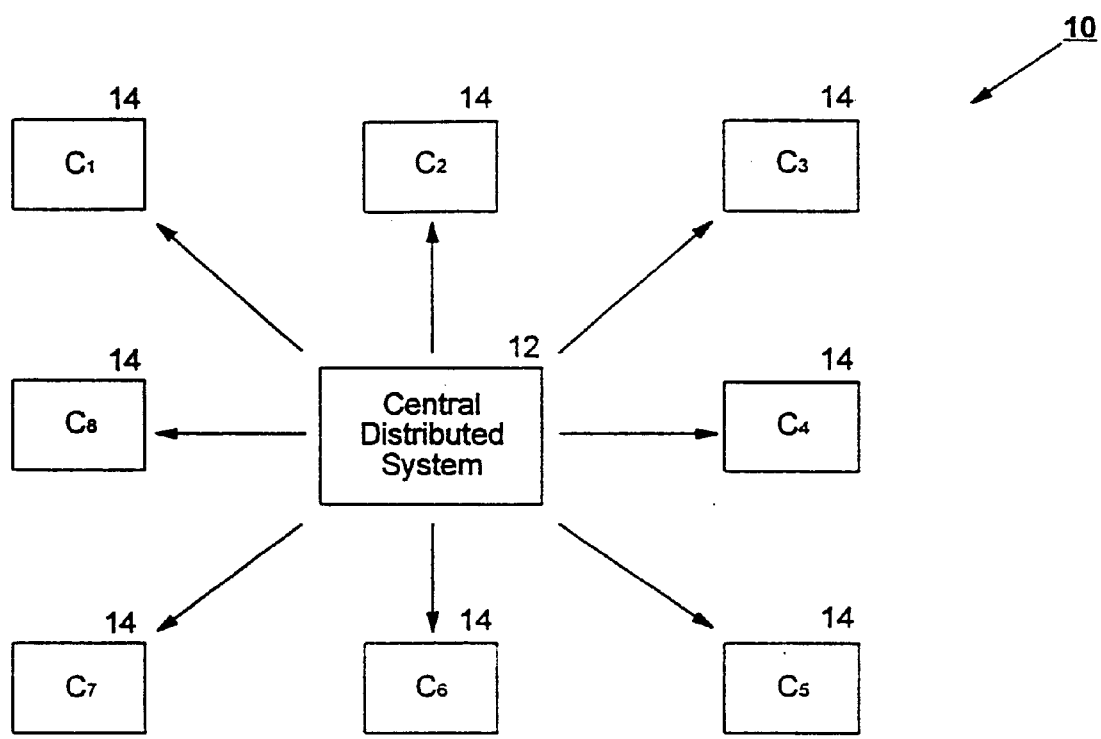
FIG. 1 is a graphical illustration of a closed network environment including a central distribution server.

Referring to the drawings, FIG. 1 illustrates a closed network 10 such as a local area network in which a central distribution server 12 controls the distribution of application software running on each of the multiple clients 14 within the network 10. In such an environment, the version updating typically requires the server 12 to undergo a complex task of updating each client 14 individually. Such procedure requires significant processor power particularly if the clients must be updated at the same time. Further, a client program may be updated unnecessarily when the program is not routinely accessed at the client.

Figure 2A:
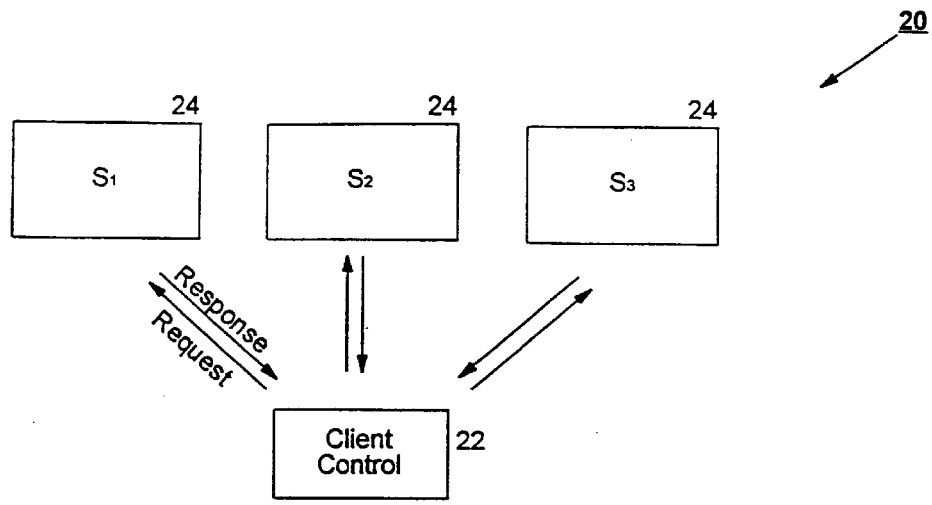
FIGS. 2A and 2B illustrate generally the client-controlled network environment of the present invention.
Figure 2B:
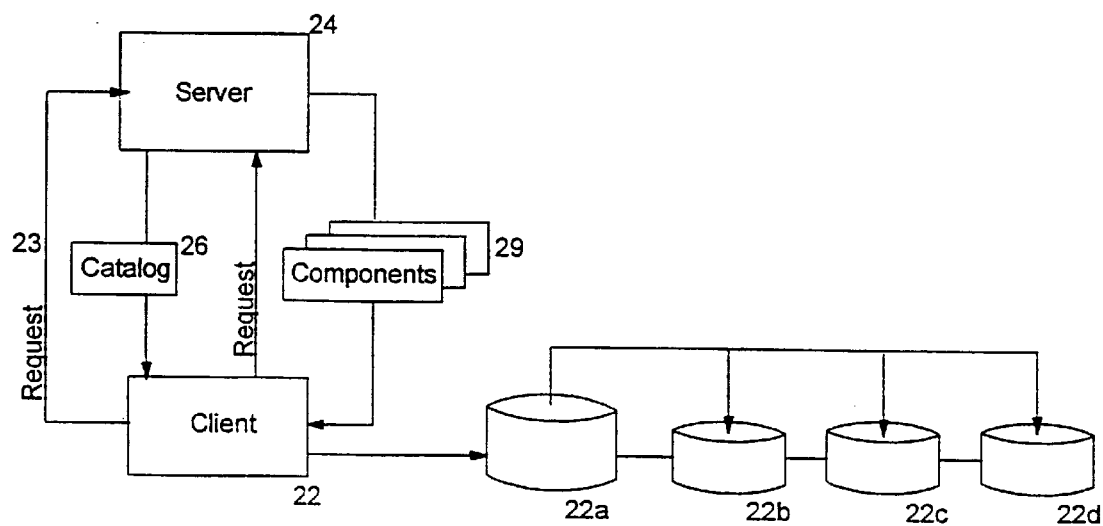

In an open network architecture, such as the Internet and intranets, the centralized program updating is difficult due to the fact that the individual clients are not necessarily controlled by the server. In the Internet, for example, a Web server communicates with a remote client on an anonymous basis and cannot easily control the parameters of the client. FIG. 2A illustrates a preferred method of the present invention wherein a client 22 controls the process of a software upgrade in the client utilizing one or more servers 24 on a network. More particularly, in FIG. 2B, a software version upgrade can be initiated through executing an application program on the client 22. The execution command transmits a request signal 23 to the server 24 which holds the latest application components. In the preferred embodiment, the server responds by downloading a catalog of a list of the application components, each identified with the latest version number. Here, the server includes either a single computer or multiple computers or other servers networked together. The catalog file is processed by the client 22 to selectively identify and retrieve required components of the application program from the server 24.

A persistent cache directory 22a on the client 22 stores a representation of the catalog file 26, which at least includes the updated list of components and version numbers on the client, for a comparison in a subsequent version check. The components may either be stored in cache 22a or in program directories, such as 22b to 22d, specified in the catalog file 26, for proper execution. It can be seen that only the components which require updating are downloaded, and they are only downloaded when there is a need because the program is being accessed at the client.

Figure 3A:
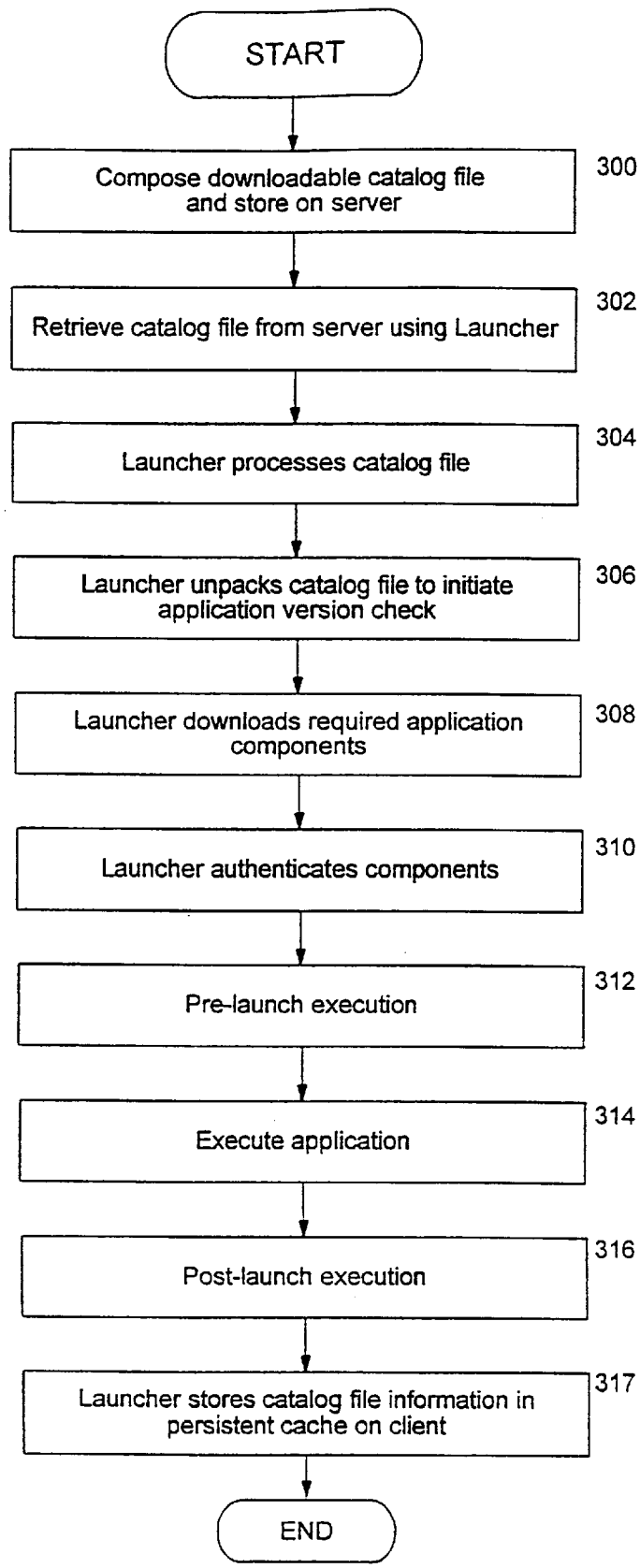
FIG. 3A illustrates the general framework in which the launcher program on a client controls a version update in conjunction with the procedure specified in the catalog file.
Figure 3B:
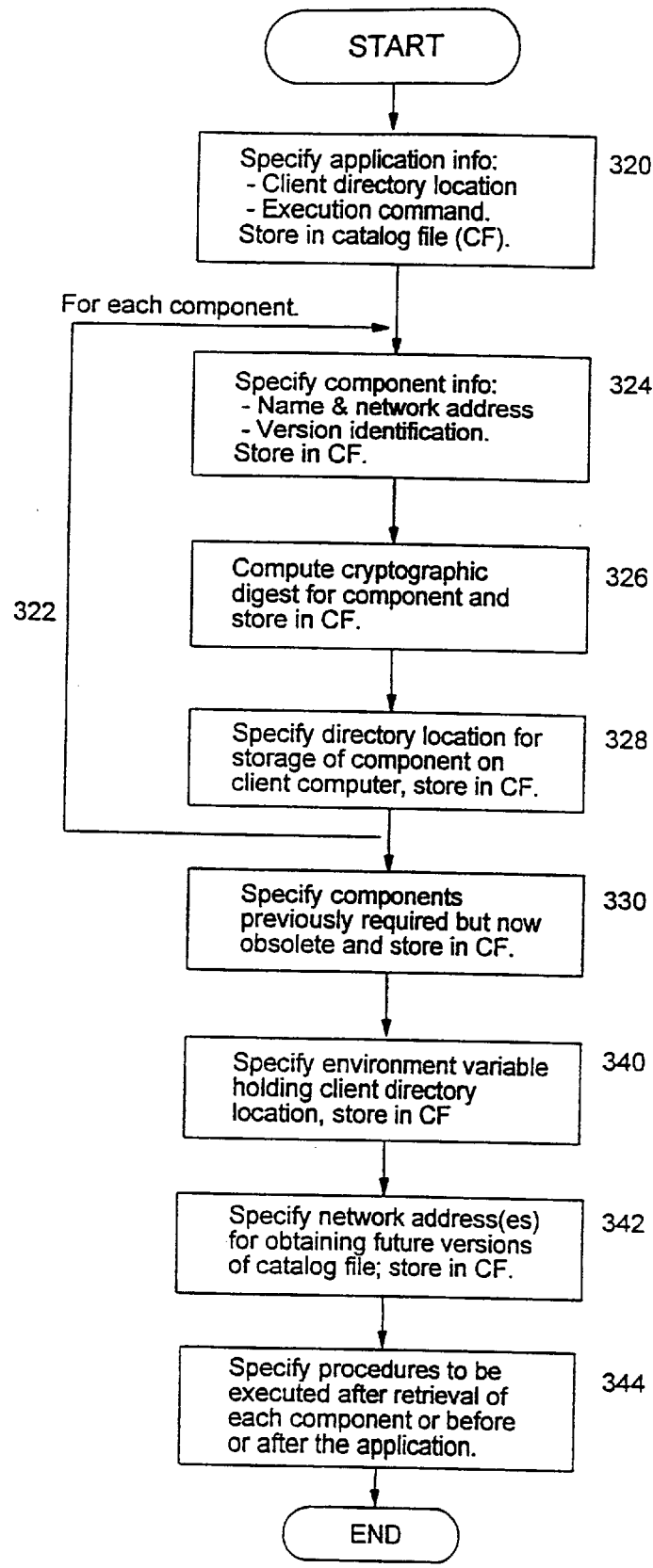
FIG. 3B illustrates the process involved in composing the preferred catalog file within the process as described in FIG. 3A.

FIG. 3A is a preferred flow sequence of a version updating process of the present invention. The process first involves packaging a catalog file 300 in the server. The catalog file is downloadable from the server to a client using standard network transfer protocol, such as the file transfer protocol or the hypertext transfer protocol. In the preferred embodiment, as described in FIG. 3B, a catalog file is prepared to include application information 320 which includes the client download directory location(s) and the execution command to the application program. For each component that is now required, the catalog file includes at 324 a version identification, code or data size, and the network address(es) where the latest version of the component is stored. The components themselves may also be included within the catalog file in certain updating situations. For each component, a cryptographic digest is computed and specified in the catalog at 326. Such an encryption is used later to verify authenticity and integrity of the component following the completion of a download in the client. The catalog further includes at 328 for each component directory or subdirectory locations on the client where the component must reside in order to allow proper execution of the application program.

Additionally, the catalog includes at 330 identifications of components previously required in the application program that are now obsolete in the new version. At 340, the catalog file can also include the client's system environment variables relative to the installation requirements in different client directory locations. An environment variable is a system wide parameter commonly used to store small items of information to be shared between multiple programs. In one embodiment of the invention, certain environment variables hold references to directories in which application components are stored on the client. The catalog can also include at 342, network locations storing future versions of the catalog file and/or the associated application components. The catalog file can further include at 344 procedures necessary for executing codes after retrieval of each component or prior to and/or following the execution of the updated application program.

Figure 3C:
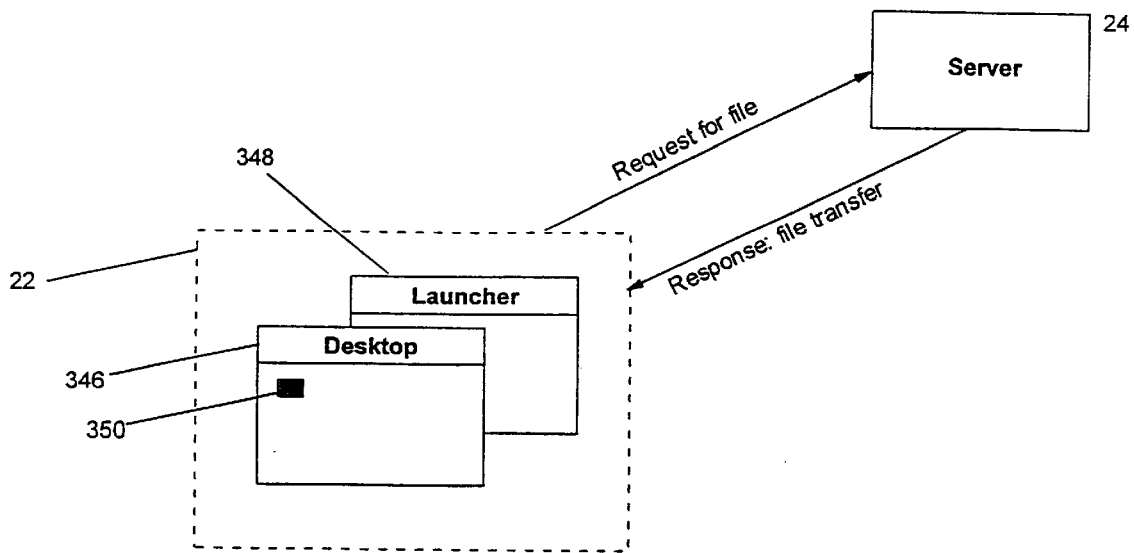
FIG. 3C is a graphical illustration of the user perspective of the launcher driven client.

Returning to FIG. 3A, the catalog file is retrieved at 302 from the server in response to a call from the client. In a preferred embodiment, as illustrated in FIG. 3C, the client 22 of the present invention includes a launcher program 348 which is automatically activated when a user selects to run the application underlying icon 350 on a desktop window 346 of the client system 22. The launcher 348 serves as a proxy to the application program and communicates with the server 24 over a network to request a download of the catalog file.

Figure 3D:
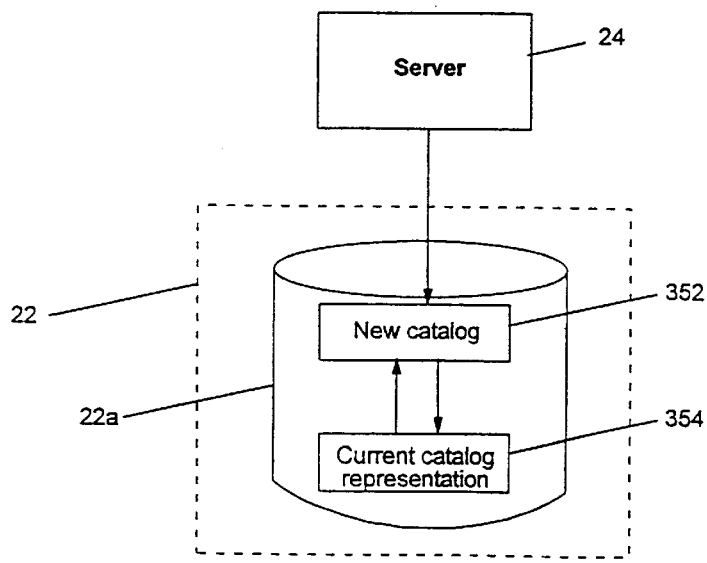
FIG. 3D is a graphical illustration of the version check process on the client.

In FIG. 3A, the launcher processes the downloaded catalog file at 304 and begins to unpack the catalog file to initiate a version check at 306. The version comparison in these steps involves comparing the contents of a new catalog file 352 downloaded from the server, as shown in FIG. 3D, with the existing representation of the catalog file 354 stored in persistent cache 22a of the client 22. The contents of the new catalog 352 reflect the latest component versions, and the catalog 354 in cache 22a lists the component versions presently installed on the client. The comparison described in these steps is only a basic requirement in an updating procedure. Other steps, as will be discussed later, can be specified in the catalog file and executed by the launcher on the client.

Further referring to FIG. 3A, the launcher at 308 engages the server to download the required components for a proper update as defined in the catalog file in 306. The encrypted components are authenticated at 310 through the cryptographic digests specified in the catalog file. The pre-launch code prescribed in the catalog file, such as a virus scan, is executed at 312. The updated and verified application program is launched and executed at 314 followed by any post-launch activities at 316 also defined in the catalog file. Information in the catalog file, which at least includes the updated list of components and version numbers on the client, is stored at 317 in cache on the client until the subsequent version update.

The launcher program can be configured in different ways to accommodate users with different options to control and update the application program. In one embodiment, as shown in FIG. 4A, the launcher is a stand-alone program which can be executed through a desktop icon 400 on a client window. Selecting the icon executes the launcher program which provides a user with a dialog window to either select an existing application program to update at 401 or specify the network address of the catalog file for a new application at 402. Through the launcher dialog window(s), a user can select any application program either to execute, or to update and execute, or simply to update the components therein. In another embodiment, as shown in FIG. 4B, an icon directed to the application program can be installed on the client desktop window at 404. Selecting the icon automatically launches the launcher program in the background to begin an updating process. At 405, the launcher program in this embodiment is pre-configured with network address(es) of the catalog file as a parameter of the program.

Figure 4D:
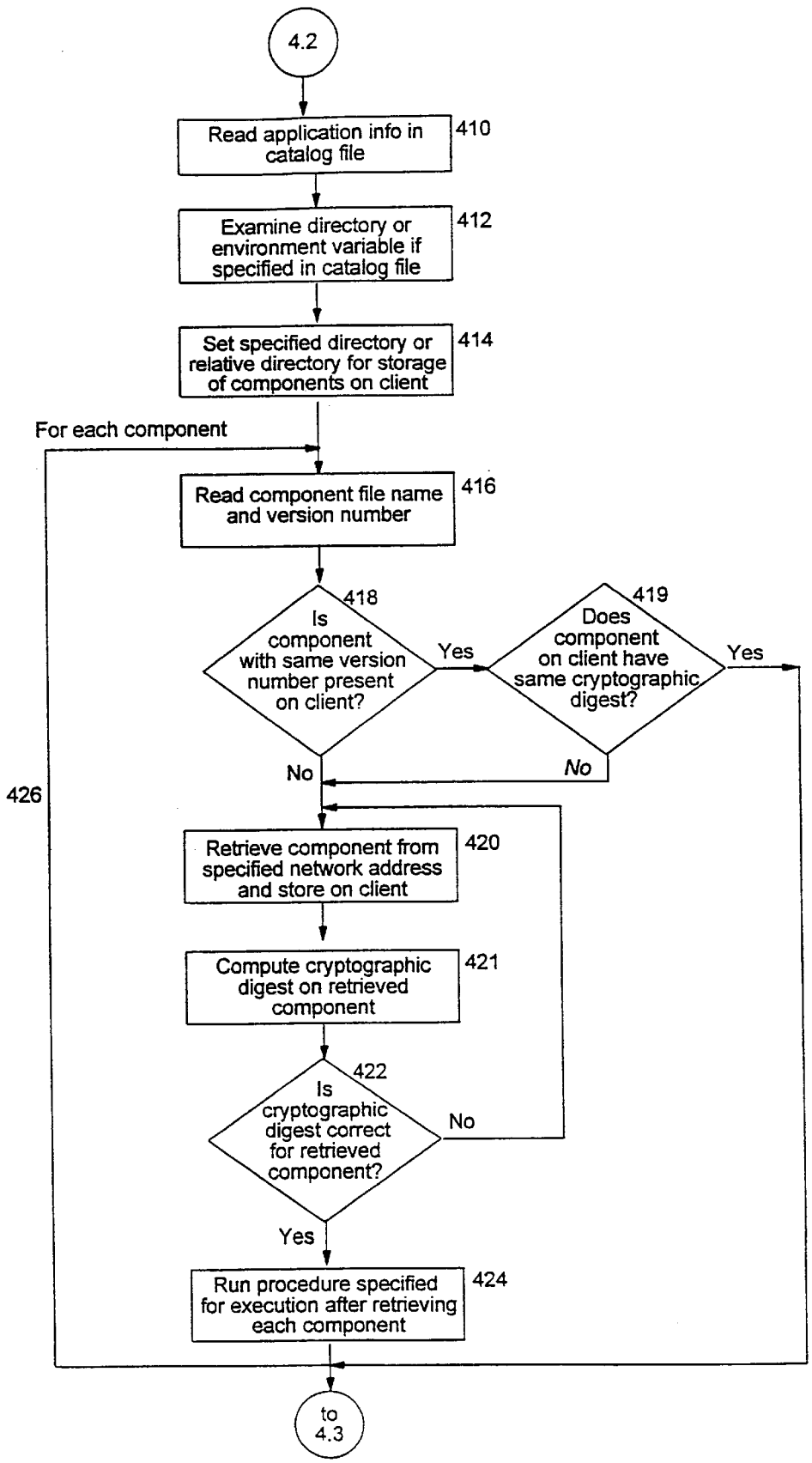
Figure 4E:
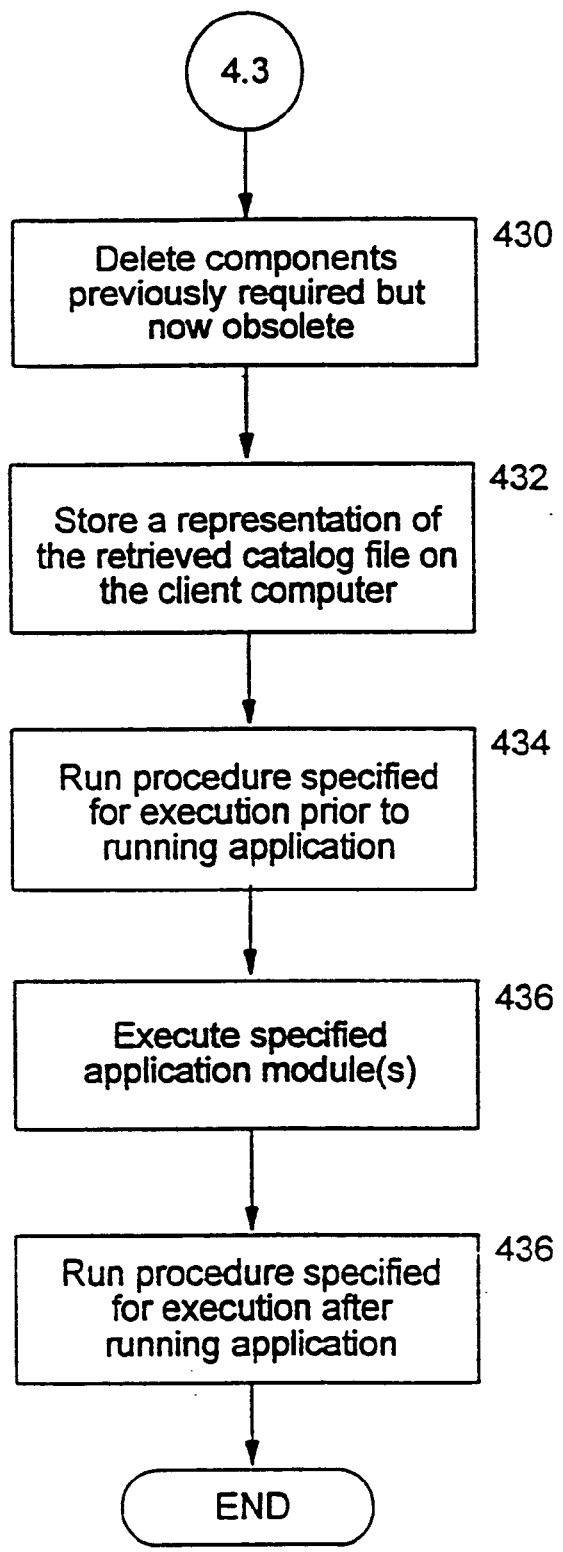

FIGS. 4C through 4E further illustrate the preferred process of the present invention. In the preferred embodiment, a user may either invoke at 406 an icon directly associated with the application program or run the launcher program at 407 to select a particular application program to update. In either option, the launcher program, executes with the address of the catalog file to initiate program update at 408. At 409, the launcher retrieves the catalog file from the specified server address or from a local disk, and, at 410, the launcher reads the application information in the retrieved catalog file. The application information is as described in FIG. 3B and includes the client download directory location(s) and the execution command and procedure relative to the application program. The catalog file is further examined for any environment variable pertaining to the client system which instructs the launcher as to how the components are installed on the client. At 414, the launcher designates appropriate directories on the client where the components should be stored.

The process for identifying the individual component files to download from the server begins at 416. At 416, the launcher reads the next component file name and version number or identification from the retrieved catalog file of the latest component versions made available on the server. Each component version number is compared at 418 with the current component version numbers listed in a previous catalog file representation stored in cache on the client. If the version number is correct, the cryptographic digest is checked at 419. Any component not on the client or showing different version numbers or different cryptographic digest are selected and retrieved from the specified server location 420. The cryptographic digest is computed on a retrieved component at 421 and confirmed at 422. An incorrect or a corrupted component is similarly replaced at 420. At 424, the launcher program executes any procedure such as virus scan decryption or expansion of encrypted or compressed component files specified in the catalog file after retrieving each component.

Once the components have downloaded, any existing components on the client that are not no longer needed as a result of the version update are deleted at 430. At 432, information in the catalog file, which at least includes the list of the components of updated application program, is stored in cache on the client for use in a subsequent update. The launcher then executes at 434 the pre-launch procedures specified in the catalog, such as virus scan, prior to executing the application program at 436. The process completes by running the post-launch procedures at 438.

The catalog file can also be specified to include a procedure to delete the components following the execution of the updated application program to free up disk space on the client.

Figure 5:
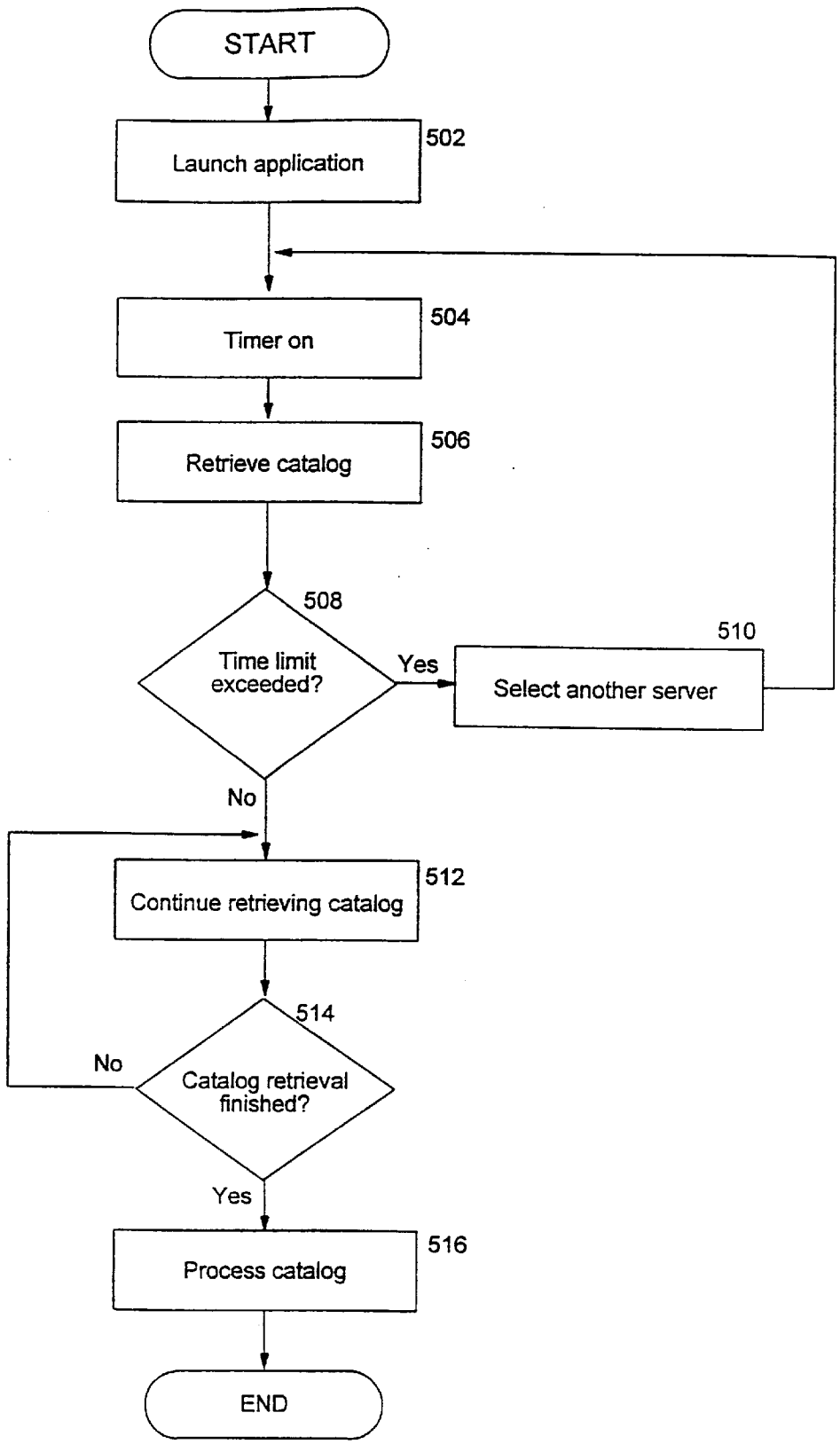
FIG. 5 illustrates another aspect of the present invention relating to minimizing download wait time.

One aspect of the present invention relates to enhancing speed and efficiency with which an application program on a client is updated and executed so that the program runs with the most current data and/or coding structure. FIG. 5 describes a preferred method of the present invention in which the client monitors and limits the time spent on an initial download of the catalog file from a server to a client. In the preferred embodiment, the catalog file previously stored on the client includes a maximum wait time interval specified as the time within which the transmission of the catalog file to the client in response to an application launch command should be completed. Such a time limit is to ensure that the catalog file is delivered quickly, and to identify and break a client-server communication jam which might delay the download indefinitely if the particular session were maintained. As indicated previously, the catalog file previously stored on the client includes the network addresses of alternate servers storing the catalog file. Referring to FIG. 5, in response to an application launch from a client at 502, a timer is triggered to count down the maximum wait time interval specified in the catalog file at 504. While the catalog file is being retrieved at 506 the timer is monitored against the maximum wait limit at 508. If the download has exceeded the time limit, the launcher in the client terminates the session and connects to a different server at 510 to initiate a new download. The timer is again activated, and the time limit is monitored until the download is completed at 514.

Figure 6A:
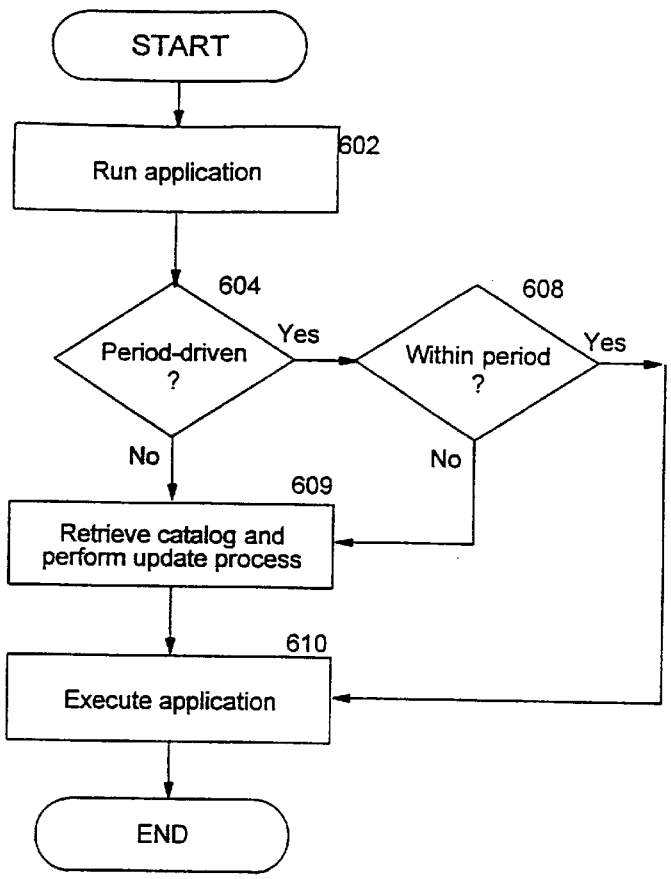
FIGS. 6A and 6B illustrate a further aspect of the present invention relating to client configuration.
Figure 6B:
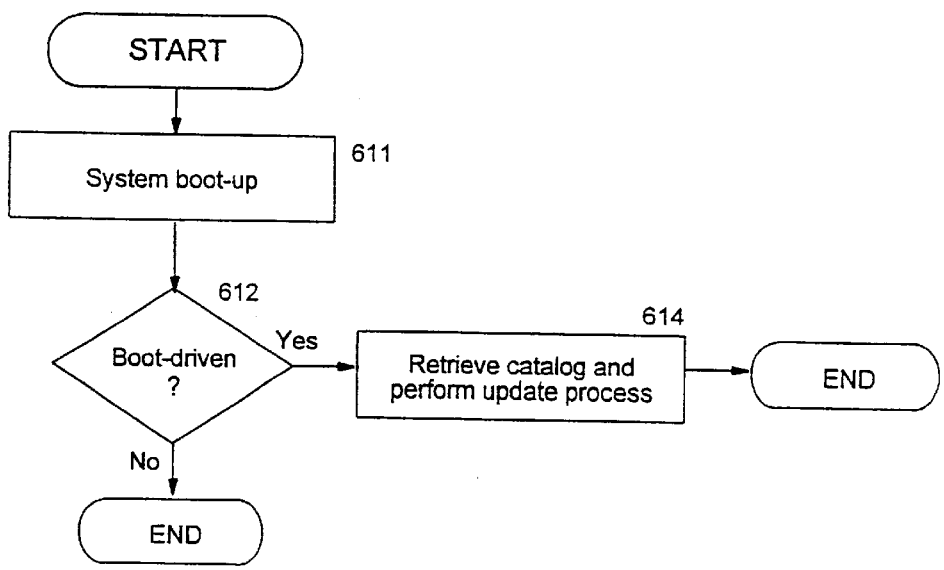

Another aspect of the present invention relates to providing user flexibility at the client to control the updating procedures. In a preferred embodiment, as described in FIGS. 6A and 6B, a client can be configured to adapt a number of different updating schedules. In this embodiment, an application program may be selected to run either from a client desktop at 602 or during a boot sequence at 611, and the associated launcher is automatically executed to run a sequence of parameter checks. At 604, if the launcher is configured to run an update on a periodic basis, such as on a daily, weekly, or monthly basis, the launcher, through an internal calendar or clock, checks to determine if a new update is due with respect to the last update at 608, and, if so, executes an update process once within such a period at 609. If the update is specified during a boot sequence 611, the launcher is executed at 612 during such boot and performs the version update at 614 typically without executing the application program. In all the other configured situations the client defaults to run the launcher automatically in each application launch, unless otherwise specified by the user or in the catalog file. In the defaults, sending the launcher can be implemented as a component part of the client operating system to run invisibly in the background.

Figure 7A:
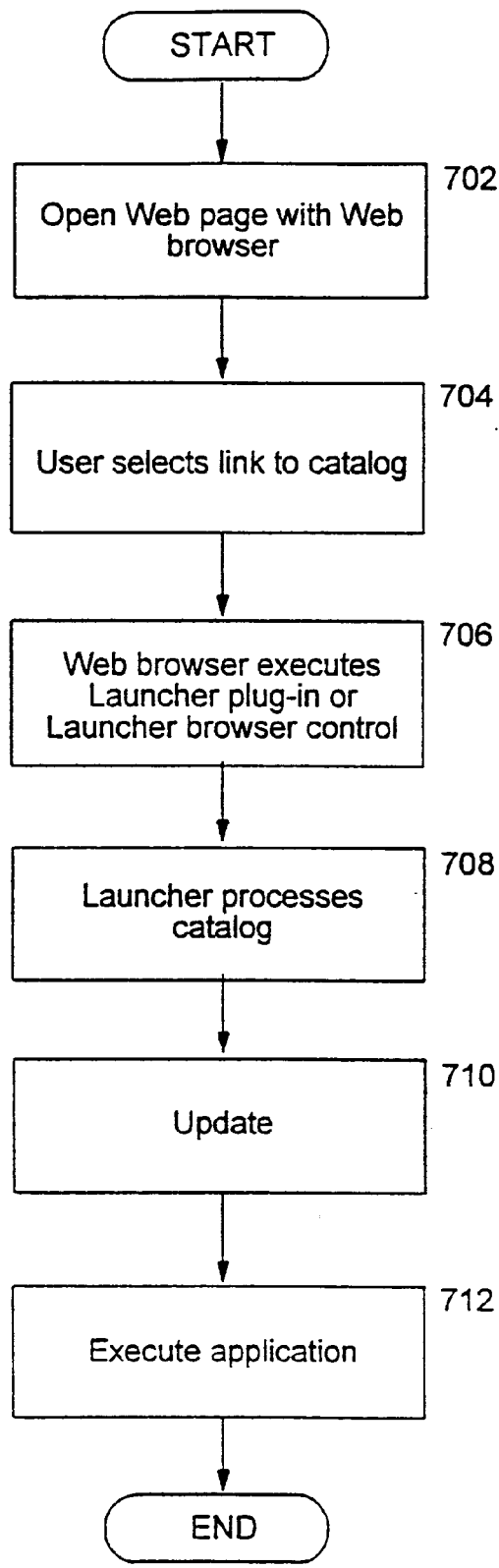
FIGS. 7A through 7C illustrate preferred implementations of the methods of the present invention in the Internet environment.

Yet another aspect of the invention relates to providing fully controlled client-server environment within an open network architecture, such as the Internet. In one preferred embodiment, as described in FIG. 7A, the client is a World Wide Web (Web) client, such as a Web browser, and the automatic version upgrading process is implemented to run fully within such a browser. In this embodiment, a hypertext link at 704 to an application program is provided within a hypertext markup language (HTML) document displayed on a Web page. Such a link is a uniform resource locator directed to a server site which makes available the catalog file for download through either the file transfer protocol (ftp) or the hypertext transfer protocol (http). The launcher program which receives and processes the catalog file is embedded (706) into the browser as a "plug-in" module or as a native browser control. A plug-in module is an integrated component of a browser which enables the execution of non-Web applications within the browser environment. A native browser control is built into the browser, and is hence more tightly integrated than any add-on modules on separate executables. At 708, the launcher is engaged to process the downloaded catalog file. Accordingly the components are downloaded to update the application program without leaving the Web browser at 710 and the program is executed at 712.

Figure 7B:
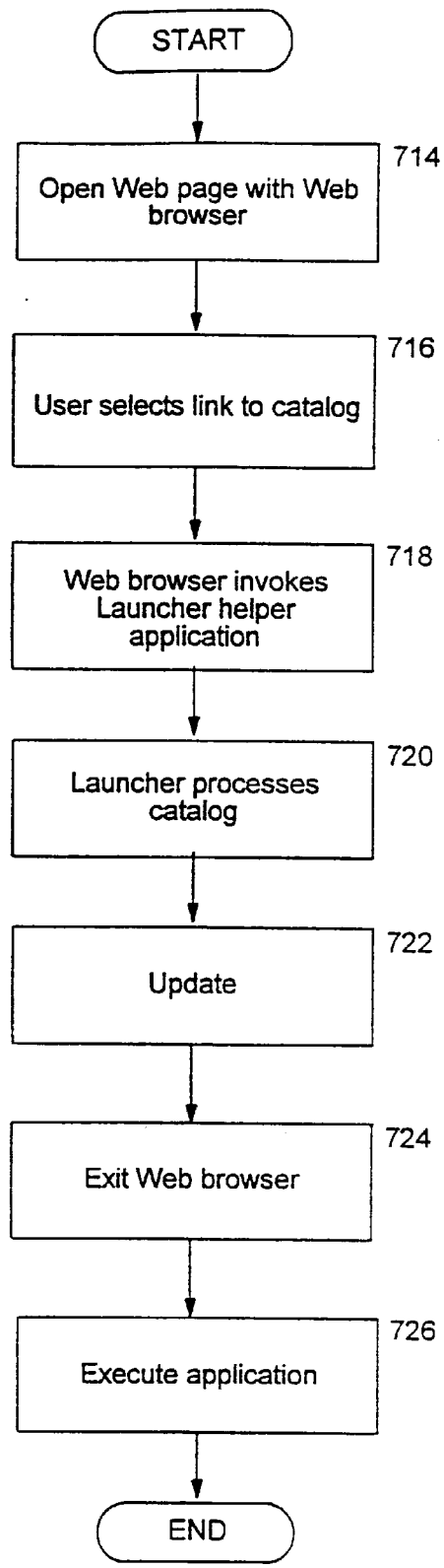

In another embodiment, the launcher program is implemented as a browser "helper application." In FIG. 7B, selecting the link directed to the catalog file on a Web page initiates the download and version check on the client at 716 to 720. The resulting updated application components are stored in the client cache directory or in the appropriate program directories 722. The updated application program can be executed either within the Web session or after exiting the Web browser at 726. The catalog file can also be specified to include a procedure to install on the client desktop an icon or a shortcut which enables the end user to run the application without accessing the Web page in subsequent updates.

Figure 7C:
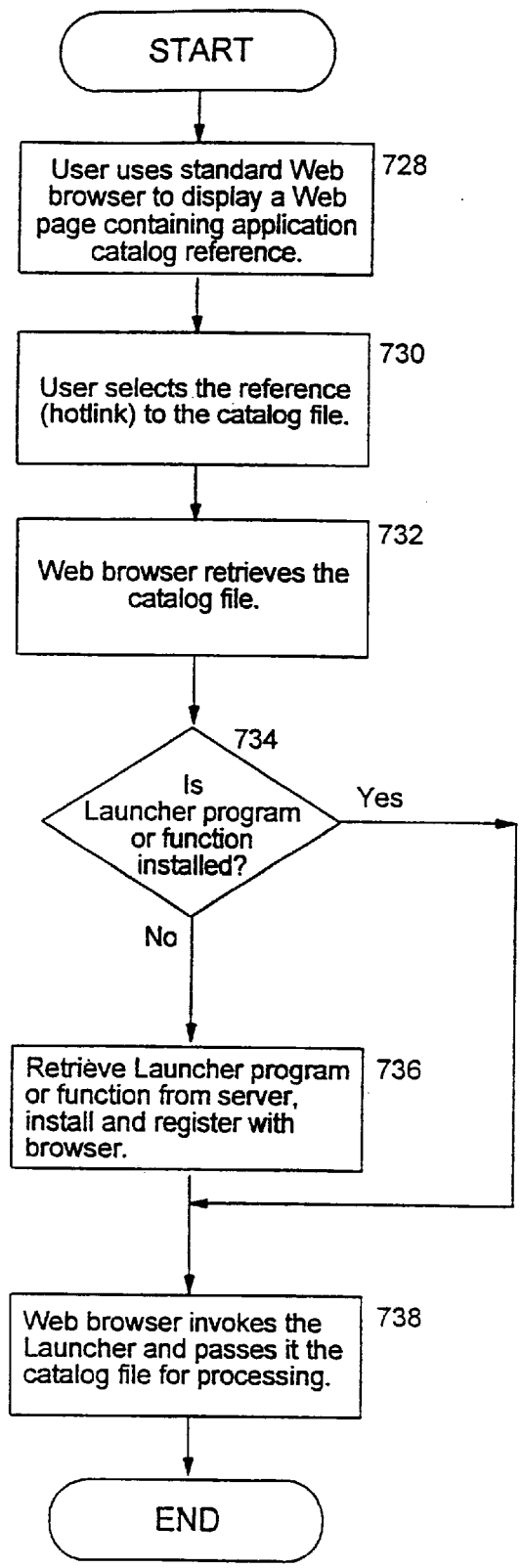

FIG. 7C illustrates a preferred process in which a Web client, such as a Web browser, is configured not only to retrieve a component catalog file from a server but also to retrieve a launcher program to implement the update procedures on the client computer. At 728 and 730, a user, through a standard Web browser on a client, selects a link directed to the catalog file on a remote server. The browser, through a standard Internet protocol, such as hypertext transfer protocol, retrieves the catalog file at 732 in response to the link. At 734, the browser is specified to query and determine whether the client maintains a launcher program. If the launcher program is present on the client, the browser invokes the launcher at 738 to begin the update process. In the event the client does not support a launcher, the browser is directed to download a launcher program from the server and to install the launcher integrally into the browser at 736.

Equivalents

While the invention has been described in connection with specific methods and apparatus, it is to be understood that the description is by way of example and not as a limitation to the scope of the invention as set forth in the claims.

We claim:

1. A method of maintaining application program components on a network comprising:

maintaining on a server the application program, the program including components, each having a version identification, and maintaining a catalog of components with the version identifications;

maintaining the application program on a client;

at the client, identifying an application program for update;

in response to a call to the server from the client, causing the server to download to the client the catalog for the identified application program and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

wherein substantially all processing, other than file transfers, in updating the application program is performed at the client.

2. A method as claimed in claim 1 further comprising storing in a persistent cache on the client a portion of the catalog which includes the components of the updated application program on the client.

3. A method as claimed in claim 1 further comprising updating the application program on the client by downloading from the server to the client the selected components not present on the client.

4. A method as claimed in claim 1 wherein the server downloads the catalog and components to the client for updating the application program on the client by way of hypertext transfer protocol.

5. A method as claimed in claim 1 wherein the server downloads the catalog and components to the client for updating the application program on the client by way of file transfer protocol.

6. A method as claimed in claim 1 wherein the catalog maintained on the server includes network addresses of further servers from which the components can be retrieved.

7. A method as claimed in claim 1 wherein the catalog maintained on the server includes directory locations on the client in which the downloaded components are stored for proper execution of the application program.

8. A method as claimed in claim 1 wherein the call to the server is transmitted to the server by a launcher on the client which operates as a proxy to the application program such that selecting the application from the client to execute the program engages the launcher to communicate with the server to cause the server to download the catalog, update the application program on the client, and execute the updated application program on the client.

9. A method as claimed in claim 8 wherein the launcher is a functional component of an operating system running on the client.

10. A method as claimed in claim 1 wherein the catalog includes procedures for executing supplemental programs on the client prior to executing the updated application program.

11. A method as claimed in claim 10 wherein the supplemental programs are executed following the execution of the application program.

12. A method as claimed in claim 10 wherein the supplemental programs include a virus scanning program.

13. A method as claimed in claim 1 further comprising specifying a maximum wait-time interval to limit any delay associated with updating the application program, and in a catalog maintained on the client specifying a list of further servers on the network, each including a copy of the catalog, such that when the server fails to download the catalog within the maximum wait-time interval, the client cancels the download and routes the call to one of the further servers to engage a new download and so on until the catalog has been downloaded within the specified maximum wait-time interval.

14. A method as claimed in claim 1 further comprising:

specifying in the catalog a cryptographic digest for each component to ensure authenticity and integrity of the component;

updating the application program on the client by downloading from the server to the client and replacing the selected components for which the cryptographic digests do not match; and computing the cryptographic digests on the client to ensure that the downloaded components are authentic and that the components have not been corrupted during transmission.

15. A method as claimed in claim 1 further comprising:

specifying in the catalog any component of the application program which are no longer needed to execute the program; and in response to the call to the application program from the client, updating the application program by downloading the catalog from the server to the client and deleting the selected components on the client that are no longer needed prior to executing the updated program.

16. A method as claimed in claim 1 further comprising specifying a time interval in the catalog, and the application program is updated only on a first time the application is run in the specified time interval.

17. A method as claimed in claim 16 wherein the time interval is specified by a user from the client.

18. A method as claimed in claim 1 further comprising specifying a fixed time interval in the catalog at which the application program is updated regardless of whether the call to the server is made from the client.

19. A method as claimed in claim 18 wherein the application program is updated at the fixed time interval only as necessary to maintain the application program current without executing the application.

20. A method as claimed in claim 1 wherein the application program on the client is automatically updated on the client each time the client is booted up.

21. A method as claimed in claim 1 further comprising recording in a file the status of each updating of the application program including names of the components replaced, deleted or added on the client and related procedures for tracking and reporting the program updates.

22. A method as claimed in claim 1 wherein the components include executable codes, library files, parameter files, and data files of the application program.

23. A method as claimed in claim 1 wherein the network is the Internet, the server is an Internet server, and the client is a World Wide Web browser, and the call to the server is made through a hypertext link on the browser directed to the catalog on the server.

24. A method as claimed in claim 23 wherein the Web browser includes a launcher program, the launcher program being executed when the hypertext link to the catalog is selected on the browser, to update the application program and to execute the updated application program thereafter.

25. A method as claimed in claim 24 wherein the launcher program is a plug-in module to cooperatively run with the browser.

26. A method as claimed in claim 24 wherein the launcher program is a helper application to cooperatively run with the browser.

27. A method as claimed in claim 23 further comprising specifying in the catalog a procedure to install an icon on the client which enables a user to subsequently execute the application program without accessing the browser.

28. A method as claimed in claim 23 further comprising specifying in the catalog a procedure to determine whether a launcher program is present on the client, and if the launcher program is not present, retrieving from the server the launcher program and installing the program into the Web browser.

29. A method as claimed in claim 1 wherein the network is an intranet and the client is a World Wide Web browser, and the call to the application program is made through a hypertext link on the browser directed to the catalog on the server.

30. A method as claimed in claim 29 wherein the Web browser includes a launcher program, the launcher program being executed when the hypertext link to the catalog is selected on the browser, to update the application program and to execute the updated application program thereafter.

31. A method as claimed in claim 30 wherein the launcher program is a plug-in module to cooperatively run with the browser.

32. A method as claimed in claim 30 wherein the launcher program is a helper application to cooperatively run with the browser.

33. A method as claimed in claim 29 further comprising specifying in the catalog a procedure to install an icon on the client which enables a user to subsequently execute the application program without accessing the browser.

34. A method as claimed in claim 29 further comprising specifying in the catalog a procedure to determine whether a launcher program is present on the client, and if the launcher program is not present, retrieving from the server the launcher program and installing the program into the Web browser.

35. A method as claimed in claim 1 further comprising specifying in the catalog a procedure to delete the components immediately after executing the updated application to free up disk space on the client.

36. A system for maintaining an application program on a network comprising:
   a server for maintaining the application program, the program including components, each being provided with a version identification;
   a catalog on the server for specifying the components with the version identifications;
   a client which maintains the application program and, where a user selects the application program to execute the program, first causes the server to download the catalog to the client, compares the version identifications of the components maintained on the server, indicated in the downloaded catalog, and the version identifications of the components maintained on the client, updates the application program on the client by downloading from the server to the client the selected components for which the version identifications do not match and by replacing the selected components on the client, and thereafter executes the updated application program.

37. A system as claimed in claim 36 wherein a portion of the catalog, which includes the components of the updated application program on the client, is stored in a cache on the client.

38. A system as claimed in claim 36 wherein the application program on the client is updated by downloading from the server to the client the selected components not present on the client.

39. A system as claimed in claim 36 wherein the plurality of servers downloads the catalog and components to the client for updating the application program on the client by way of hypertext transfer protocol.

40. A system as claimed in claim 36 wherein the plurality of servers downloads the catalog and components to the client for updating the application program on the client by way of file transfer protocol.

41. A system as claimed in claim 36 wherein the catalog maintained on the server includes network addresses of further servers from which the components can be retrieved.

42. A system as claimed in claim 36 wherein the catalog maintained on the server includes directory locations on the client in which the downloaded components are stored for proper execution of the application program.

43. A system as claimed in claim 36 further comprising a launcher on the client to operate as a proxy to the application program such that when the user selects the application program from the client to execute the program, the launcher is engaged first to communicate with the server to cause the server to download the catalog to the client, update the application program on the client, and execute the updated application program on the client.

44. A system as claimed in claim 43 wherein the launcher is a functional component of an operating system running on the client.

45. A system as claimed in claim 43 wherein the launcher is a stand-alone program on the client for updating the application programs on the client.

46. A system as claimed in claim 36 wherein the catalog includes procedures for executing supplemental programs on the client prior to executing the updated application program.

47. A system as claimed in claim 46 wherein the supplemental programs are executed following the execution of the application program.

48. A system as claimed in claim 46 wherein the supplemental programs include a virus scanning program.

49. A system as claimed in claim 36 wherein the catalog further includes a maximum time interval to limit any delay associated with updating the application program, and a list of further servers on the network, each further server including a copy of the catalog such that when the server fails to download the catalog within the maximum wait-time interval, the client cancels the download and routes the call to one of the further servers to engage a new download and so on until the catalog has been downloaded within the specified maximum wait-time interval.

50. A system as claimed in claim 36 wherein the catalog specifies a cryptographic digest for each component to ensure authenticity and integrity of the component, and the client updates the application program on the client by downloading from the server and replacing the selected components of the application program for which the cryptographic digests do not match, and computing the cryptographic digests on the client to ensure that the downloaded components are authentic and that the components have not been corrupted during transmission.

51. A system as claimed in claim 36 wherein the catalog includes a list of any components of the application program which are no longer needed to execute the program so that, in response to a call to the application program on the client to execute the program, the client updates the application program by downloading the catalog from the server to the client and deleting the selected components on the client which are no longer needed prior to executing the updated program.

52. A system as claimed in claim 36 wherein the catalog includes a time interval and the application program is updated only on a first time the application is run in the specified time interval.

53. A system as claimed in claim 52 wherein the predefined time interval is specified by a user from the client.

54. A system as claimed in claim 36 wherein the catalog includes a fixed time interval at which the application program is updated regardless of whether a call to the application program is made from the client.

55. A system as claimed in claim 54 wherein the application program is updated at the fixed time interval only if an update is necessary to maintain the application program current without executing the application.

56. A system as claimed in claim 36 wherein the application program on the client is automatically updated by an operating system on the client each time the client is booted up.

57. A system as claimed in claim 36 further comprising a file on the client to record status of each updating of the application program, the status including names of the components replaced, deleted or added on the client and related procedures for purpose of tracking and reporting the program updates.

58. A system as claimed in claim 36 wherein the components include executable codes, library files, parameter files, and data files of the application program.

59. A system as claimed in claim 36 wherein the network is the Internet, the server is an Internet server, and the client is a World Wide Web browser, and the user selects the application program for execution through a hypertext link on the browser directed to the catalog on the server and procedures in the browser for engaging a download of the components and execution of the program thereafter.

60. A system as claimed in claim 59 further comprising a launcher program installed on the Web browser, the launcher program being executed when the hypertext link is selected on the browser to update the application program and to execute the updated application program thereafter.

61. A system as claimed in claim 59 further wherein the catalog is specified with a procedure to install an icon on the client which enables a user to subsequently execute the application program without accessing the browser.

62. A system as claimed in claim 59 wherein the catalog is specified with a procedure to determine whether a launcher program is present on the client, and if the launcher program is not present, retrieving from the server the launcher program and installing the program into the Web browser.

63. A system as claimed in claim 36 wherein the network is an intranet and the client is a World Wide Web browser, and the user selects the application program for execution through a hypertext link on the browser directed to the catalog on the server, the Web browser including a launcher program, which is executed when the hypertext link to the catalog is selected, to update the application program and to execute the updated application program thereafter.

64. A system as claimed in claim 36 wherein the catalog is specified with a procedure to delete the components immediately after executing the updated application to free up disk space on the client.

65. A programmed data processing client comprising:
an application program including components, each being provided with a version identification; and
a launcher program which, when a user selects the application program to execute the program:
causes a server to download a catalog to the client, the catalog specifying the components with the version identifications;
compares the version identifications of the components indicated in the downloaded catalog with version identifications of the components maintained on the client; and
updates the application program on the client by downloading from the server to the client the selected components for which the version identifications do not match and by replacing the selected components on the client.

66. A program on a storage device providing instructions, for execution on a client, which:

when a user selects to execute an application program on the client, the application program including components, each component having a version identification, cause a server to download a catalog of components with the version identifications;
compare the version identifications indicated in the catalog with the version identifications of the components maintained on the client; and
update the components on the client by downloading from the server to the client the selected components for which the version identifications do not match and replacing the selected components on the client.

67. A method of installing and automatically updating application programs on a plurality of client computers attached to a common network comprising the steps of:
storing various components of the application programs on one or more server computers attached to the same network with each server operating with standard protocol to automatically transmit a specified file in response to a standard file transfer request;
creating a catalog file which lists the names of all the required components of each of said application programs, and specifying for each component a current version identification and either a content of the component or a network address from which the component can be retrieved by the standard file transfer request;
storing the catalog file on one or more of said server computers; and
installing on each client computer a launcher program which operates as a proxy for each of said application programs and which executes steps for each application program comprising:
retrieving the current version of said catalog file and comparing the components and their version identifications to corresponding information in a second catalog of application components already stored on the client computer;
retrieving from their designated network addresses any components which said launcher program determines as either not present or having incorrect version identifications;
installing the retrieved components in a standard program component directory;
storing the retrieved catalog file to identified the components present on the client in a subsequent update; and
executing the application program.

68. A method as claimed in claim 67 further comprising:
creating on a World Wide Web site a link on a Web page to the catalog file; and
installing on each client computer the launcher program configured as a helper application in a Web browser to automatically execute whenever the link is selected to retrieve the catalog file.

69. A method as claimed in claim 67 wherein the launcher program is configured as a Web plug-in module.

70. A method of maintaining an application program in a client-server environment comprising:
maintaining on a server the application program, the program including the components, each having a version identification, and maintaining a catalog of components with the version identifications;
in response to a first call to the server from a client, causing the server to download the catalog to the client and the application program;

maintaining on the client the application program and information in the downloaded catalog including a list of the components with the version identifications;

in response to a subsequent call to the server from the client, causing the server to download a second catalog including the latest version identifications of the components and of any new additional components on the server;

comparing in the client the latest version identifications of the components in the second catalog with the version identifications of the components maintained on the client;

updating the application program on the client by downloading from the server to the client the selected components for which the version identifications do not match; and executing the updated application program on the client.

71. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client wherein the catalog maintained on the server includes network addresses of further servers from which the components can be retrieved.

72. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client wherein the catalog includes procedures for executing supplemental programs on the client prior to executing the updated application program.

73. A method as claimed in claim 72 wherein the supplemental programs are executed following the execution of the application program.

74. A method as claimed in claim 72 wherein the supplemental programs include a virus scanning program.

75. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising specifying a maximum wait-time interval to limit any delay associated with updating the application program, and in a catalog maintained on the client specifying a list of further servers on the network, each including a copy of the catalog, such that when the server fails to download the catalog within the maximum wait-time interval, the client cancels the download and routes the call to one of the further servers to engage a new download and so on until the catalog has been downloaded within the specified maximum wait-time interval.

76. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising:

specifying in the catalog a cryptographic digest for each component to ensure authenticity and integrity of the component;

updating the application program on the client by downloading from the server to the client and replacing the selected components for which the cryptographic digests do not match; and computing the cryptographic digests on the client to ensure that the downloaded components are authentic and that the components have not been corrupted during transmission.

77. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising specifying in the catalog any component of the application program which are no longer needed to execute the program; and in response to the call to the application program from the client, updating the application program by downloading the catalog from the server to the client and deleting the selected components on the client that are no longer needed prior to executing the updated program.

78. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client the catalog for the identified application program and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising specifying a time interval in the catalog, and the application program is updated only on a first time the application is run in the specified time interval.

79. A method as claimed in claim 78 wherein the time interval is specified by a user from the client.

80. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising specifying a fixed time interval in the catalog at which the application program is updated regardless of whether the call to the server is made from the client.

81. A method as claimed in claim 80 wherein the application program is updated at the fixed time interval only as necessary to maintain the application program current without executing the application.

82. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client the catalog for the identified application program and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

wherein the application program on the client is automatically updated on the client each time the client is booted up.

83. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

wherein the components include executable codes, library files, parameter files, and data files of the application program.

84. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

wherein the network is the Internet, the server is an Internet server, and the client is a World Wide Web browser, and the call to the server is made through a hypertext link on the browser directed to the catalog on the server.

85. A method as claimed in claim 84 wherein the Web browser includes a launcher program, the launcher program being executed when the hypertext link to the catalog is selected on the browser, to update the application program and to execute the updated application program thereafter.

86. A method as claimed in claim 85 wherein the launcher program is a plug-in module to cooperatively run with the browser.

87. A method as claimed in claim 85 wherein the launcher program is a helper application to cooperatively run with the browser.

88. A method as claimed in claim 85 further comprising specifying in the catalog a procedure to install an icon on the client which enables a user to subsequently execute the application program without accessing the browser.

89. A method as claimed in claim 85 further comprising specifying in the catalog a procedure to determine whether a launcher program is present on the client, and if the launcher program is not present, retrieving from the server the launcher program and installing the program into the Web browser.

90. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

wherein the network is an intranet and the client is a World Wide Web browser, and the call to the application program is made through a hypertext link on the browser directed to the catalog on the server.

91. A method as claimed in claim 90 wherein the Web browser includes a launcher program, which is executed when the hypertext link to the catalog is selected, to update the application program and to execute the updated application program thereafter.

92. A method as claimed in claim 91 wherein the launcher program is a plug-in module to cooperatively run with the browser.

93. A method as claimed in claim 91 wherein the launcher program is a helper application to cooperatively run with the browser.

94. A method as claimed in claim 91 further comprising specifying in the catalog a procedure to install an icon on the client which enables a user to subsequently execute the application program without accessing the browser.

95. A method as claimed in claim 91 further comprising specifying in the catalog a procedure to determine whether a launcher program is present on the client, and if the launcher program is not present, retrieving from the server the launcher program and installing the program into the Web browser.

96. A method of maintaining application program components on a network comprising:

maintaining on a server the application program, the program including components, each having a version identification, and maintaining a catalog of components with the version identifications;

maintaining the application program on a client;

in response to a call to the server from the client, causing the server to download the catalog to the client and, in the client, comparing the version identification between the components maintained on the server, indicated in the catalog, and the components maintained on the client;

updating the application program components on the client by downloading from the server to the client the selected components for which the version identifications do not match and replacing the selected components on the client; and executing the updated application program on the client;

the method further comprising specifying in the catalog a procedure to delete the components immediately after executing the updated application to free up disk space on the client.

* * * * *